Inventor.
Albert H. Gfrorer
by Heard Smith & Tennant
Attys.

Patented Nov. 7, 1944

2,362,129

UNITED STATES PATENT OFFICE 2,362,129

POWER TRUCK

Albert H. Gfrorer, Bernardsville, N. J., assignor to Lewis-Shepard Company, Watertown, Mass., a corporation of Massachusetts Application February 25, 1943, Serial No. 477,014

5 Claims. (Cl. 214—113)

This invention relates to improvements in power trucks of the type in which the wheel-supported chassis or base of the truck is provided at one end with traction wheels and has mounted upon said end an upright mast with load supporting means mounted upon it and means for raising and lowering the load supporting means. The base or chassis of this type of truck heretofore constructed is of fabricated construction and the rear end portion or section is in the form of a platform on which is mounted a power generating unit for actuating the traction mechanism. The front end portion of such chassis has mounted upon it mechanism for tilting the mast.

In usual constructions a pair of spaced steering wheels are mounted upon or beneath the platform section with suitable mechanism for guiding the steering wheel including a vertical steering rod which is mounted in the standard with a lever or wheel for actuating the same. In such constructions the weight of the chassis and the power generating unit is insufficient to counterbalance the weight of the mast, load supporting means, and the load carried thereby, so that a counterweight is fixedly or usually detachably mounted upon the rear end of the platform. Such counterweight is in the form of a substantially rectangular block or mass of metal which is placed behind the housing for the power generating unit. In such constructions the center of mass of the truck thus assembled is at a very considerable distance above the wheel base of the truck thereby rendering the truck unstable when traveling around a curve, so that the truck is likely to tilt or turn over particularly when carrying an elevated load. Furthermore, the racking strains imposed upon the chassis of the truck when in use is likely to distort the chassis, cause misalinement of the mechanism for driving the traction wheels, and eventually to render the truck useless.

A principal object of the invention is to provide a truck of the type described with an integral base or chassis which will be immune from such defects.

A further important object of the invention is to provide the truck with a low-hung integral base of cast metal, preferably cast iron, which will position the center of mass of the truck remote from the traction wheels and in such proximity to the wheel base of the truck as to avoid the possibility of tilting of the truck by the load or by the centrifugal force applied to the truck and/or its load when traveling around a sharp curve.

In usual types of trucks the widely spaced trailing steering wheels prevent the truck from turning about a short radius when traveling around corners of narrow aisles. A further object of the invention is to provide a construction in which a single trailing wheel or pair of closely associated wheels can be mounted beneath the platform portion or section of the base, thereby enabling the truck to be turned upon a short radius preferably not exceeding the length of the truck.

Another object of the invention is to provide a power truck of the character described of such construction that any type of power generating unit, such as an internal combustion engine or an electric motor, can be mounted upon the platform, and suitable mechanism actuated by such power generating unit to drive the traction wheels and/or to raise the load supporting means upon the mast.

Another object of the invention is to provide a construction in which the mast is pivotally mounted upon the axle housing for the traction wheels in proximity to the vertical plane of the axes of said wheels and thereby diminish the leverage which is imposed upon the chassis or base of the truck when the loaded load supporting means is in elevated position.

These and other objects and features of the invention will more fully appear from the following description and the accompanying drawing and will be particularly pointed out in the claims.

A preferred embodiment of the invention is illustrated in the drawing as comprising an internal combustion engine mounted upon the platform of the base.

Figure 1:
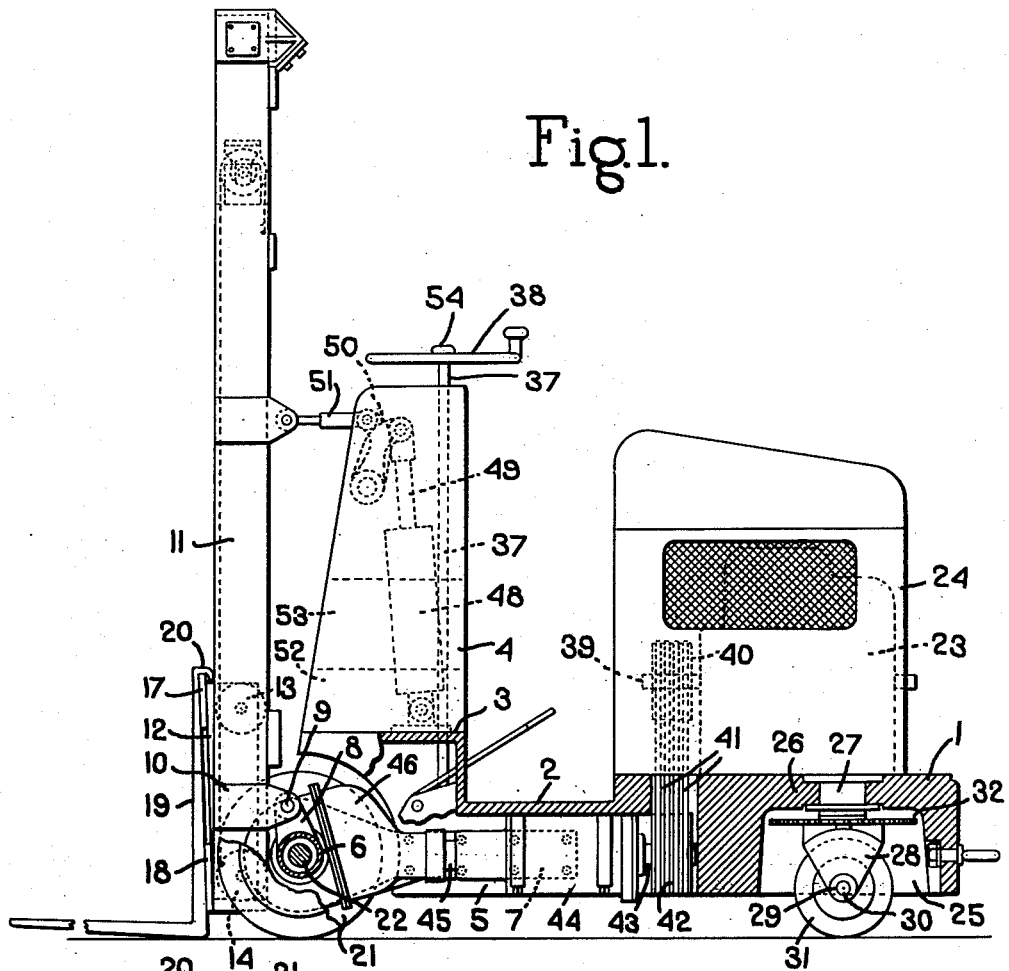
Fig. 1 is a side elevation of the truck a portion of the integral base being shown in section to illustrate the manner in which the center of mass of the truck is located remotely from the traction wheels and in such proximity to the wheel base as to stabilize the truck at all times.
Figure 2:
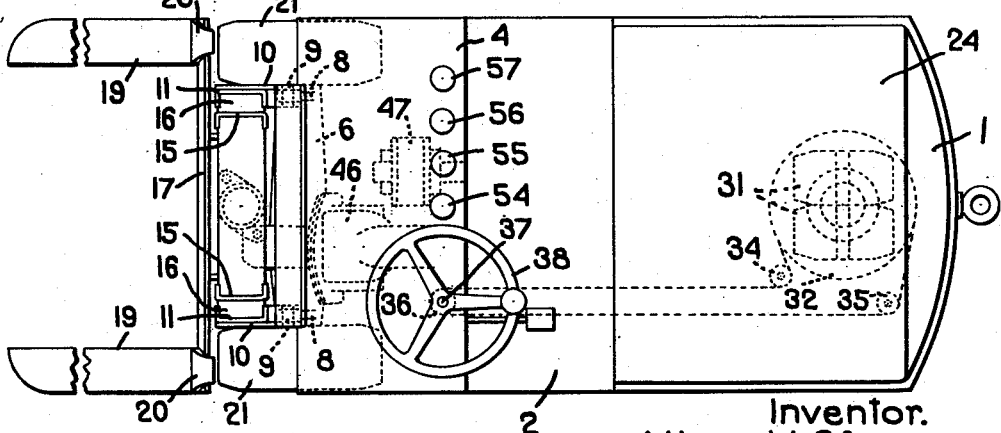
Fig. 2 is a plan view of the same.

The chassis of the truck illustrated in the accompanying drawing comprises a single piece integral metal base preferably of cast iron having a thick rear horizontal platform section 1 and extending forwardly therefrom a horizontal preferably somewhat thinner floor section 2 and a somewhat elevated front section 3 forming a base for a standard 4. The sections 2 and 3 have integral side walls 5 which preferably extend downwardly to the plane of the under face of the platform section 1. An axle housing 6 is provided at its ends with rearward extensions 7 which are bolted to the respective side walls 5. The axle housing is provided adjacent its ends with upwardly extending integral arms 8 having at their upper ends stud shafts 9 which are approximately in the vertical plane of the center of the axle housing. Brackets 10, which are fixedly secured to the sides of the mast 11 and extend rearwardly therefrom, are mounted upon the pivots 9 so that the mast may be swung toward and from vertical position in either direction. Suitable load supporting means are mounted upon the mast and means provided for raising and lowering the load supporting means thereon.

Desirably the mast is made in telescoping sections with means for raising and lowering the load supporting means vertically upon the telescoping portion of the mast and which also operates to raise the telescoping portion of the mast.

The mast, the load supporting means, and the mechanism for raising and lowering it may be of any construction well known in the art as may also be the mechanism for tilting the mast to and from vertical position. Such mechanisms are illustrated herein as a carriage 12 having at its upper and lower ends suitable pairs of rollers 13 and 14 which are mounted in the sides of vertical channel bars 15 of the telescoping mast section which in turn is provided with pairs of rollers 16 which travel in the channel of the vertical channel bars of the main mast section 11. The carriage is provided with upper and lower transverse plates or bars 17 and 18 and the load engaging members are in the form of L-shaped arms 19 provided with hooked ends 20 adapted to be hooked over the upper edge of the upper transverse bar 17 so that they can be adjusted laterally toward and from each other properly to engage beneath the load or skid or to enter the chambers of a pallet. Driving or traction wheels 21 are fixedly mounted upon independent axles 22 which are journaled in suitable antifriction bearings in the axle housing 6.

In usual constructions heretofore made a power generating unit is mounted upon the platform section of a fabricated base but the weight thereof is often insufficient to counterbalance the mast and the load carried thereby. As a consequence it has been customary to mount a heavy weight, usually in the form of a comparatively thin vertical and high block of iron upon the rear end of the platform section adjacent to the rear end of the housing for the power generating unit. In such constructions the center of mass of the truck particularly when the load is supported in elevated position is at such distance above the wheel base that the truck is likely to tilt or tip over when traveling along a curve. This defect is overcome in the present invention by reason of the low hung thick and heavy platform section upon which a power generating unit such as an internal combustion engine 23 is mounted and enclosed in a suitable housing 24. By reason of this construction the center of mass of the truck, whether loaded or unloaded, is positioned remotely from the traction wheels and in such proximity to the plane of the wheel base of the truck as to avoid all liability of the tipping of the loaded truck either forwardly or laterally irrespective of the position of the mast or to the height at which the load is supported upon it.

Furthermore, the one-piece integral base provides a solid construction which cannot be affected by racking strains imposed upon the base during the loading and transportation of the truck which has resulted in distortion of the members of the fabricated chassis of previous constructions. By providing a one-piece integral base construction as above described the center of mass of the truck is so lowered as to enable the use of a single trailing steering wheel positioned centrally of the rear end portion of the truck.

In the preferred construction illustrated the thickened rear portion of the platform section of the base is provided with a circular cavity 25 which extends upwardly from its under face to such suitable distance from the upper face of the platform section as to provide a rigid wall 26 to receive a preferably antifriction bearing 27 for a steering post having downwardly extending bracket sections 28 provided with antifriction bearings 29 for the axle 30 of a steering wheel or preferably dual steering wheels 31. Suitable mechanism may be provided for guiding the steering wheel. As illustrated herein the steering post has secured to it a sprocket wheel 32 which is engaged by an endless chain 33 which extends around the greater portion of the sprocket wheel and is guided by suitable idle sprockets 34 and 35 around a sprocket pinion 36 upon the vertical shaft 37 which is mounted in suitable bearings in the standard 4 and is provided at its upper end with a hand wheel 38.

By reason of the positioning of the center of mass of the truck in closer proximity to the wheel base of the truck in the present construction than in previous constructions a shorter truck may be employed than in previous constructions which will enable it to pass more readily around sharp corners.

The chamber beneath the center and front sections 2 and 3 of the integral base provides ample room for mounting the power transmitting mechanism for driving the traction wheels and also the mechanism for actuating the load supporting means and for actuating the mast-tilting mechanism. As illustrated in the present construction the shaft 39 of the internal combustion engine is provided with a pulley or preferably a plurality of pulleys 40 which drive belts 41 which in turn drive complementary pulleys 42 upon a shaft 43 which in turn drives suitable transmission mechanism contained in a housing 44 in the recess of the central section 2 which in turn drives a shaft 45 leading to differential gearing contained in a casing 46 and which in turn drives the respective shafts of the traction wheels 21. The chamber beneath the front section 3 of the housing is of sufficient size to contain a suitable pumping mechanism 47 for supplying liquid under pressure to a hydraulic ram 48 for raising and lowering the telescoping section of the mast and for supplying liquid under pressure to the hydraulic cylinder 48 having a ram 49 for tilting the mast through a bell crank lever 50 and link 51. Inasmuch as such mechanisms are well known in the art they need not be illustrated in detail herein.

The front standard 4 preferably contains a tank 52 for gasoline for operating the internal combustion engine and also a tank 53 containing oil for operating the hydraulic mechanism.

The standard also desirably is provided with suitable controlling means 54 for tilting the mast, controlling means 55 for elevating and lowering the load supporting means, speed controlling means 56 for the motor and means 57 for controlling the reversing mechanism of the truck, all of which preferably are in alinement and within easy reach of an operator standing upon the floor 2 of the central section of the base.

By reason of the present construction above described the center of mass of the truck and its load are so located remotely from the traction wheels and in such proximity to the wheel base as to prevent tilting of the truck in any direction and under any circumstances, and a shorter wheel base is permitted than in usual constructions. By reason of the centrally located trailing steering wheel the truck can be turned upon a short radius of considerably less length than the length of the truck. This is very advantageous where the truck has to be driven along a narrow aisle having abrupt or right angle turns.

While the invention has been described herein particularly with reference to a power truck driven by an internal combustion engine, it will be readily understood that the integral base, steering mechanism and other essential features of the truck herein described may be employed in an electrically driven truck in which the power generating means are heavy storage batteries mounted upon the platform section of the truck with suitable motors for actuating the traction wheels, raising the load supporting means and tilting the mast mounted in the chambers beneath the central and front sections of the base or if desirable within the standard in place of the storage tanks illustrated herein.

It will be understood that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. A power truck of the class described having a chassis provided with a wheel-supported base having mounted on the front end thereof spaced traction wheels and a pivotally supported mast provided with load supporting means, and means for actuating the same, said base comprising a one-piece integral metal casting having a recessed front section to receive the mounting for the traction wheels and the driving mechanism therefor and a solid rear horizontal platform section of such thickness, extending downwardly from the upper surface thereof, as to position the center of mass of the truck so remote from the mast and the traction wheels and in such proximity to the wheel base of the truck as to overcome the weight of the mast and the load carried thereby.

2. A power truck of the class described having a chassis provided with a wheel-supported base having mounted on the front end thereof spaced traction wheels and a pivotally supported mast provided with load supporting means, and means for actuating the same, said base comprising a one-piece integral metal casting having a recessed front section to receive the mounting for the traction wheels and the driving mechanism therefor and a solid rear horizontal platform section of such thickness, extending downwardly from the upper surface thereof, as to position the center of mass of the truck so remote from the mast and the traction wheels and in such proximity to the wheel base of the truck as to overcome the weight of the mast and the load carried thereby, the thick platform section having a cavity extending upwardly from its lower face in proximity to and centrally of the rear end thereof, and steering mechanism mounted on said platform section within said cavity.

3. A power truck of the class described, having at one end an upright mast, load supporting means mounted thereon and means for raising and lowering said load supporting means comprising a solid integral wheel supported base provided at one end with traction wheel mechanism and means for pivotally supporting said mast and having a heavy rearwardly extending horizontal platform section, supporting a power unit, with steering mechanism mounted thereon, said platform section being of such downwardly extending thickness as to position the center of gravity of the mass of the truck when loaded so remote from the mast, and traction wheel mechanism, and in such proximity to the plane of the wheel base as to prevent tilting of the truck by the load or by centrifugal force when the truck carrying an elevated load is traveling around a curved path, said platform section having near its rear end a central cavity extending upwardly from its under face in which the steering mechanism is mounted.

4. A power truck of the class described, having at one end an upright mast, load supporting means mounted thereon and means for raising and lowering said load supporting means, comprising a wheel supported integral cast iron base having mounted on its front end an axle housing, for the shaft of traction wheels, having vertical arms for pivotally supporting said mast, traction wheels mounted in said housing, said base having a rearwardly extending horizontal thick platform section having a power generating unit mounted thereon and having near its rear end a central cavity and also provided with a forwardly extending recess for power transmitting mechanism, steering mechanism mounted in said cavity, the thickened portion of the platform section extending downwardly and so located as to position the center of mass of the truck and power generating unit remote from said mast and traction wheel and in such proximity to the wheel base as to prevent tilting of the truck by the load or by centrifugal force when the truck carrying an elevated load travels around a curved path.

5. A chassis base for a power truck of the class described comprising a one-piece integral metal casting having a recessed front section to receive the mounting for a spaced traction wheel and a solid horizontal platform section rearwardly of said chambered section of much greater thickness and weight than that of said chambered section and provided adjacent its rear end with a central cavity extending upwardly from its lower face to receive the steering mechanism.

ALBERT H. GFRORER.